United States Patent Office 3,642,886
Patented Feb. 15, 1972

3,642,886
OXIDATION PROCESS
Dhafir Yusuf Waddan and Derek Williams, Manchester, England, assignors to Imperial Chemical Industries Limited, London, England
No Drawing. Filed Dec. 16, 1968, Ser. No. 784,200
Claims priority, application Great Britain, Dec. 22, 1967, 58,294/67
Int. Cl. C07c 55/04, 55/14, 55/16
U.S. Cl. 260—533 C                11 Claims

ABSTRACT OF THE DISCLOSURE

Oxidising cycloalkene with ozonised oxygen in a medium comprising at least 60% of water, preferably in two stages, resulting in the production of a carboxylic acid.

---

This invention relates to a process for oxidising cycloalkenes to ozonides and to dicarboxylic acids.

It is known to oxidise cycloalkenes to dicarboxylic acids in two steps by treatment with ozonised oxygen. In the first step, which is usually carried out at low temperatures, ozone reacts with the cycloalkene to form an ozonide, and in the second step the ozonide is decomposed at higher temperatures to form the dicarboxylic acid. Numerous solvents have been used in the prior art processes. Sometimes two solvents have been used, one for each of the two steps. In a process which seeks to avoid the disadvantage of using two solvents it has been proposed to use a fatty acid solvent, particularly propionic acid, for both steps, and in this process water may be present in each step. Thus using a fatty acid as solvent it has been proposed to operate the ozonisation step in the presence of water in a preferred proportion of 1% to 10% and the decomposition step in the presence of a preferred proportion of 10% to 50% of water, based in each case on the total weight of the fatty acid solution.

According to the present invention a process for oxidising a cycloalkene comprises treating the cycloalkene with ozonised oxygen in the presence of a reaction medium comprising at least 60% by weight of water.

It is preferred to use a reaction medium which contains no organic component, so that expense and recovery problems are avoided. Water alone is a suitable reaction medium, but advantageously there may be used an aqueous solution of inorganic material which remains inert under the reaction conditions, for example an inorganic salt, e.g. sodium chloride, or an inorganic acid, e.g. sulphuric acid. The reaction proceeds in a heterogeneous mixture since the cycloalkene is not soluble in the medium. If desired a surface active agent may be present to promote emulsification of the cycloalkene in the reaction medium. Any such surface active agent should, of course, remain inert under the reaction conditions.

Ozonised oxygen used in the process may be in admixture with gas which remains inert in the process for example nitrogen. The use of such gas mixture containing 5 to 25% of ozonised oxygen is preferred.

Cycloalkenes which may be oxidised in the process of the invention may contain for example from 5 to 12 carbon atoms. Examples are cyclopentene, cyclohexene, cyclooctene and cyclododecene.

When the process is operated at low to moderate temperatures e.g. from −20° to +30° C. ozone reacts with the double bond of the cycloalkene with the production of an ozonide which can be isolated by known techniques if desired.

Preferably however the process is used as a means of obtaining dicarboxylic acids from cycloalkenes. For this purpose it is desirable to operate the process in two steps in a manner similar to that which is already known for the prior art processes. Ozonide formation takes place in the first step at low to moderate temperatures and in the second step at a higher temperature, e.g. from 80° to 120° C. the ozonide decomposes to produce dicarboxylic acid. For the first step it is desirable to employ ozonised oxygen containing a fairly high proportion of ozone relative to oxygen e.g. from 0.5% to 7%, especially 1% to 5% by weight, and to continue the passage of ozonised oxygen until completion of ozonisation is indicated by the presence of ozone in the effluent gases. For the second step only a low proportion of ozone relative to oxygen is desirable, for example from 0.01% to 3%, especially 0.1% to 1% by weight. In this step oxidation by molecular oxygen takes place, with the ozone acting catalytically. The use as medium of an aqueous solution of an inorganic salt or acid may facilitate the first step by enabling a temperature below 0° C. to be reached and the second step by enabling a temperature in excess of 100° C. to be reached.

When oxidation to dicarboxylic acid has proceeded sufficiently the product may be isolated quite simply, for example by cooling the mixture, filtering off the solid and washing.

Compared with prior art processes the process of the present invention is advantageous because of its cheapness and because it avoids the necessity for solvent recovery.

The process therefore provides a valuable means of oxidising cycloalkenes to dicarboxylic acids such as adipic acid, suberic acid and lauric acid which are intermediates for use in the production of the linear polyamides known as nylons.

The invention is illustrated but not limited by the following examples in which the percentages are by weight.

EXAMPLE 1

A mixture of cyclooctene (15 ml.) and water (85 ml.) was placed in a reactor equipped with an efficient stirrer and a reflux condenser. The mixture was cooled to 10° C. and an oxygen stream containing 1.5% ozone was passed through at a rate of 700 ml./minute. When the cyclooctene was saturated with ozone (as indicated by a potassiumiodide trap) the ozone concentration in the oxygen stream was reduced to 0.3–0.5% and the reaction mixture was heated to 90° C. for 5 hours. The crude solid product (4.3 g.) contained 96% of suberic acid.

In the experiments described in this example and Examples 2–4 much of the cyclooctene was lost through inefficient condensation.

EXAMPLE 2

A mixture of cyclooctene (15 ml.) and a saturated solution of sodium chloride in water (85 ml.) was treated as in Example 1 except the ozonisation was carried out at 0° C. The crude solid product (6.4 g.) contained 83.4% of suberic acid.

EXAMPLE 3

A mixture of cyclooctene (15 ml.) and water (85 ml.) containing Cetavlon (2 g.) which acted as an emulsifier, was treated as in Example 1 except the ozonisation was carried out at 5° C. The crude solid product (4.8 g.) contained 95% of suberic acid.

("Cetavlon" is a registered trademark).

EXAMPLE 4

A mixture of cyclooctene (15 ml.), water (80 ml.) and concentrated sulphuric acid (5 ml.) was treated as in Example 1. The crude solid product (5.9 g.) contained 97% of suberic acid.

EXAMPLE 5

A mixture of cyclododecene (5 ml.) and water (95 ml.) containing Cetavlon (2 g.) which acted as an emulsifier was treated as in Example 1. The crude solid product (2.5 g.) contained 92% of dodecanedioic acid.

In a similar way cyclopentene and cyclohexene may be oxidised to pimelic acid and adipic acid respectively.

We claim:

1. A process for the manufacture of an aliphatic dicarboxylic acid which process comprises contacting a cycloalkene of 5 to 12 carbon atoms with ozonised oxygen in the presence of a reaction medium consisting essentially of from 60 to 100% by weight of water said process being operated in the following two steps:
   (a) a first step at −20° to +30° C. resulting in the production of an ozonide
   (b) a second step at 80 to 120° C. resulting in the oxidation of said ozonide to aliphatic dicarboxylic acid.

2. Process according to claim 1 wherein the reaction medium is an aqueous solution of inorganic material which is inert under the conditions used.

3. Process according to claim 1 wherein a surface active agent is used to promote emulsification of the cycloalkane in the reaction mixture.

4. Process according to claim 1 wherein the first step is carried out using ozonised oxygen in which the proportion of ozone relative to oxygen is from 0.5 to 7% by weight.

5. Process according to claim 1 wherein the first step is carried out using ozonised oxygen in which the proportion of ozone relative to oxygen is from 1% to 5% by weight.

6. Process according to claim 1 wherein the second step is carried out using ozonised oxygen containing a proportion of ozone relative to oxygen of 0.01% to 3% by weight.

7. Process according to claim 1 wherein the second step is carried out using ozonised oxygen containing a proportion of ozone relative to oxygen of 0.1 to 1% by weight.

8. Process according to claim 4 wherein the second step is carried out using ozonised oxygen containing a proportion of ozone relative to oxygen of 0.01 to 3% by weight.

9. Process according to claim 4 wherein the second step is carried out using ozonised oxygen containing a proportion of ozone relative to oxygen of 0.1 to 1% by weight.

10. Process according to claim 5 wherein the second step is carried out using ozonised oxygen containing a proportion of ozone relative to oxygen of 0.01 to 3% by weight.

11. Process according to claim 5 wherein the second step is carried out using ozonised oxygen containing a proportion of ozone relative to oxygen of 0.1 to 1% by weight.

References Cited

UNITED STATES PATENTS 3,284,492  11/1966  Fremery et al. ____ 260—533 X

FOREIGN PATENTS 965,510  7/1964  Great Britain _____ 260—533

LORRAINE A. WEINBERGER, Primary Examiner

R. D. KELLY, Assistant Examiner

U.S. Cl. X.R.

260—537 P